United States Patent
Ranzoni

(10) Patent No.: US 8,381,753 B2
(45) Date of Patent: Feb. 26, 2013

(54) METHOD FOR MAKING A SAFETY VALVE OF A BOILER OF A DEVICE FOR MAKING A HOT BEVERAGE, PARTICULARLY COFFEE, AND SAFETY VALVE

(75) Inventor: Francesco Ranzoni, Coccaglio (IT)

(73) Assignee: Bialetti Industrie S.p.A., Coccaglio (Brescia) (IT)

( * ) Notice: Subject to any disclaimer, the term of this patent is extended or adjusted under 35 U.S.C. 154(b) by 1060 days.

(21) Appl. No.: 11/663,027

(22) PCT Filed: Sep. 24, 2004

(86) PCT No.: PCT/IT2004/000522
§ 371 (c)(1),
(2), (4) Date: Jan. 18, 2008

(87) PCT Pub. No.: WO2006/033127
PCT Pub. Date: Mar. 30, 2006

(65) Prior Publication Data
US 2008/0185054 A1 Aug. 7, 2008

(51) Int. Cl.
*F16K 27/00* (2006.01)
(52) U.S. Cl. .................. 137/15.18; 137/540; 29/890.13
(58) Field of Classification Search ............. 137/543.23, 137/543.21, 540, 542, 15.18; 29/890.122, 29/890.13
See application file for complete search history.

(56) References Cited

U.S. PATENT DOCUMENTS

| | | | | |
|---|---|---|---|---|
| 2,069,153 A | * | 1/1937 | Konkle | 29/890.13 |
| 2,549,132 A | * | 4/1951 | Robbiati | 99/307 |
| 3,504,701 A | | 4/1970 | Gross | |
| 3,725,990 A | * | 4/1973 | Petersen et al. | 29/890.122 |
| 4,546,790 A | * | 10/1985 | Huber et al. | 137/315.19 |
| 5,174,327 A | * | 12/1992 | Truax et al. | 137/469 |
| 5,271,429 A | | 12/1993 | Bauer et al. | |
| 5,901,743 A | * | 5/1999 | Schulz | 137/515.5 |

OTHER PUBLICATIONS

International Search Report dated May 27, 2005 for International Patent Application No. PCT/IT2004/000522.

\* cited by examiner

*Primary Examiner* — Kevin Lee
*Assistant Examiner* — Macade Brown
(74) *Attorney, Agent, or Firm* — Hogan Lovells US LLP

(57) ABSTRACT

A safety valve of a boiler of a device for making hot beverages, particularly coffee, comprises an intermediate valve body, a plug and resilient means inserted into the seat of the intermediate valve body. The intermediate valve body comprises a peripheral wall designed to be folded over to define a reaction portion of the resilient means and positively press the plug, obtaining a final valve body. The peripheral wall partly closes off a first opening of the intermediate valve body and the plug partly projects from the final valve body.

33 Claims, 3 Drawing Sheets

METHOD FOR MAKING A SAFETY VALVE OF A BOILER OF A DEVICE FOR MAKING A HOT BEVERAGE, PARTICULARLY COFFEE, AND SAFETY VALVE

This invention relates to a method for the manufacture of a safety valve of a boiler of a device for making a hot beverage, particularly coffee.

According to further aspect, this invention relates to a safety valve of a boiler of a device for the preparation of a hot drink, in particular coffee.

This invention relates to the sector of devices known as coffeemakers which are capable of making coffee or other types of hot beverages in a conventional way. With reference to the preparation of coffee, by a coffeemaker is meant a device which operates through heating a quantity of water within the boiler and delivering it under pressure to an upper container through a filter containing powdered coffee.

In other words, as the temperature increases the pressure within the boiler increases until it reaches a value at which the water contained therein passes to the upper container, passing through a layer of powdered coffee and extracting the flavour from it. If such delivery were to be prevented the pressure within the boiler would increase until it reached critical values, with a risk that the device might explode.

In order to avoid these risks, even though they may be remote, it is provided that the boiler be equipped with a safety valve or a vent valve designed to open when a threshold pressure is reached, as a result of which the interior of the boiler is placed in communication with the outside environment.

Known safety valves comprise a valve body which opens to the boiler and to the outside environment. Within the valve body there is housed a plug which is caused to close the opening to the boiler by resilient means, conventionally a helical spring. By determining the type of spring and its level of precompression it is possible to calibrate the safety valve so that it opens as a consequence of a particular pressure within the boiler. With this object the safety valve comprises a cover which is fixed to the valve body in order to hold the plug and the resilient means within the valve body and to suitably precompress the resilient means.

Known safety valves have some disadvantages. For example their manufacture is rather complex and costly in that it is necessary to manufacture the valve body and the cover separately and then assemble them subsequently. In addition to this the calibration of the valve mainly depends on the shape of the cover.

With reference to cheaper known valves comprising a plug of spherical shape, the valve opening may become clogged as a result of calcium deposits which it is not possible to remove from the exterior. In this case low cost is therefore accompanied by precarious reliability.

The problem underlying this invention is therefore that of providing a method for manufacturing a safety valve for a boiler of a device for the making of hot beverages, in particular coffee, which makes it possible to overcome the aforesaid disadvantages with reference to the known art.

The problem underlying this invention is also that of providing a safety valve for a boiler of a device for the making of hot beverages, in particular coffee, which makes it possible to overcome the aforesaid disadvantages with reference to the known art.

Advantageously valves according to this invention are manufactured so as to be economical (reducing manufacturing costs and the number of parts necessary for their manufacture) without compromising efficiency and functional safety. In particular, thanks to the method according to this invention it is possible to obtain a low-cost valve which continues to be reliable even after being used many times with particularly hard water, which provides the possibility for removing the calcium deposits which might obstruct it.

This problem is resolved through a method of manufacturing a safety valve for a boiler of a device for the making of hot beverages, in particular coffee, according to claim 1.

This problem is also resolved through a safety valve for a boiler of a device for the making of hot beverages, in particular coffee, in accordance with claim 24.

Other advantages and characteristics of the present invention will become clear from the following detailed description which is given with reference to the appended drawings which are provided purely by way of non-limiting example and in which:

FIG. 1 illustrates a perspective view of a device for the preparation of a hot beverage, in particular coffee, comprising a safety valve according to this invention, FIG. 2 illustrates a front view of the safety valve according to this invention, FIG. 3 illustrates a cross-sectional view along the line III-III of the safety valve in FIG. 2, FIG. 4 illustrates a longitudinal cross-sectional view of a detail of the safety valve in FIG. 2 during one stage of the method for manufacture of the aforesaid valve.

With reference to the above figures, 10 indicates as a whole a safety valve of a boiler 12 of a device for the making of hot beverages, in particular coffee, 14. More specifically safety valve 10 is designed to be mounted on the boiler of a so-called coffeemaker in order to avoid incidents due to excess pressure within the boiler itself. In other words safety valve 10 is constructed and calibrated so as to open and place the boiler in communication with the outside environment when a particular pressure is reached within the boiler.

Figure 1:
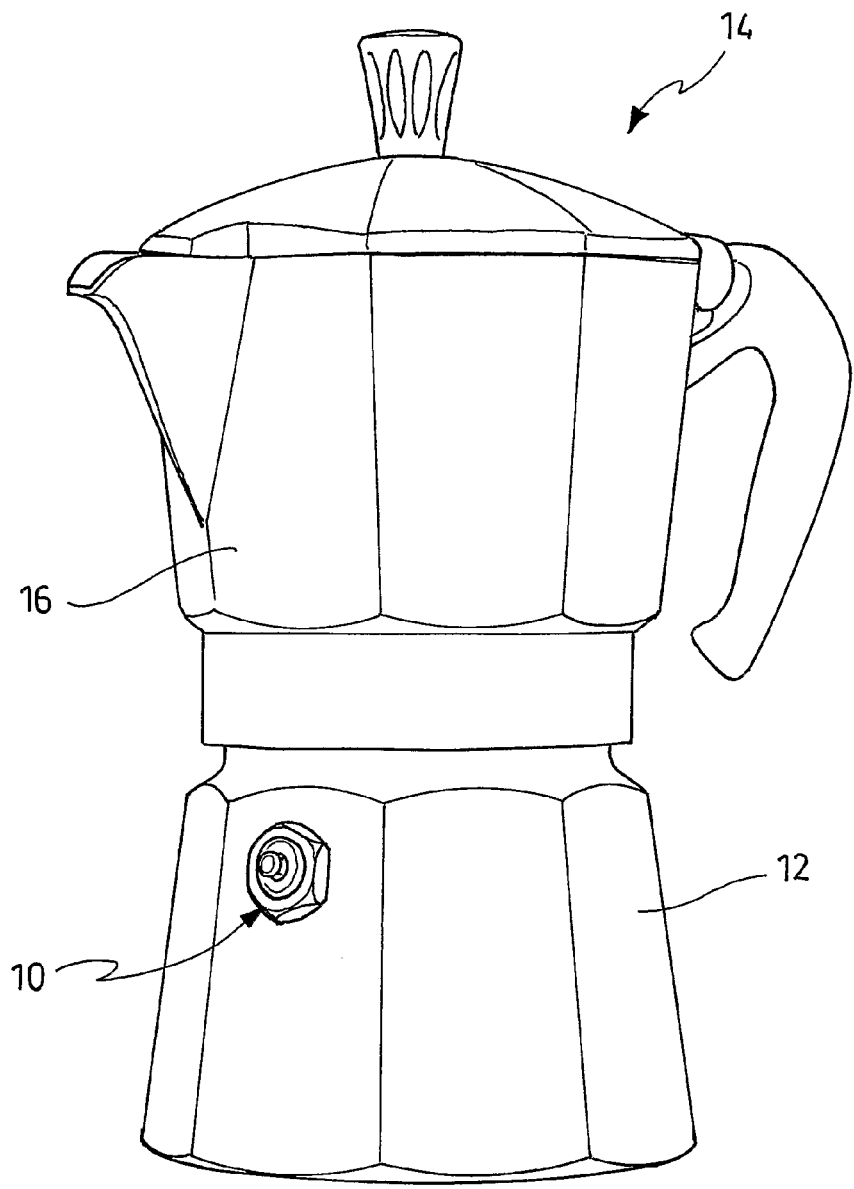

With reference to FIG. 1 device 14 comprises a container 16 screwed onto boiler 12 and further conventional internal members which are not illustrated.

Safety valve 10 comprises a valve body 18, or a final valve body defining a seat 20 designed to receive a plug 22 and resilient means 23, preferably a helical spring.

Figure 4:
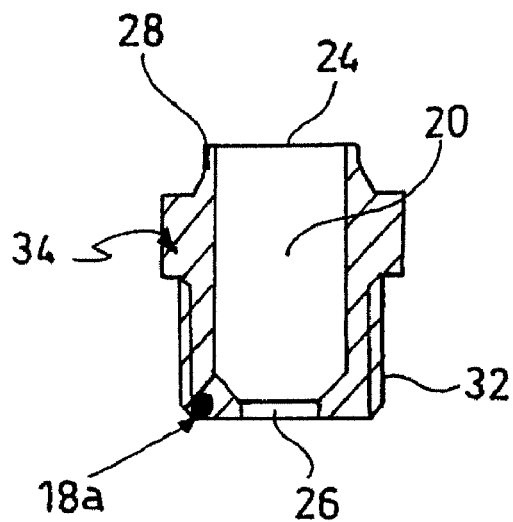

FIG. 4 illustrates a cross-section of the valve body during manufacture of the safety valve, also defined as an intermediate valve body 18a. Seat 20 of intermediate valve body 18a opens towards the exterior through a first opening 24 and a second opening 26.

Intermediate valve body 18a comprises at least one peripheral wall 28 located close to first opening 24 and designed to be folded over as will be described below in order to form final valve body 18.

With reference to the embodiments illustrated, peripheral wall 28 bounds first opening 24. According to different embodiments which are not illustrated, the peripheral wall may at least partly surround the first opening or only bound it partly. Two or more peripheral walls may possibly be provided, for example manufactured using teeth which are designed to be folded over.

According to a possible embodiment, as for example illustrated in the figures, before being folded over (FIG. 4) peripheral wall 28 has a cylindrical portion preferably located along a circumference having a lesser diameter than the size of the valve body.

Advantageously peripheral wall 28 is manufactured as one piece with the valve body.

With reference to a possible embodiment, illustrated for example in FIG. 4, peripheral wall 28 extends in one longitudinal direction 30 of seat 20 of intermediate valve body 18a. Peripheral wall 28 is designed to be subsequently folded over transversely to the longitudinal direction of seat 20, preferably towards the interior of that seat.

32 indicates a threaded portion of the valve body which is designed to be threaded into a wall of boiler 12, for example obtained before the peripheral wall is folded over. Also 34 indicates a flange portion which is designed to form a stop against the wall of the boiler and preferably has a transverse cross-section of polygonal shape.

Advantageously peripheral wall 28 extends from flange portion 34 in a direction opposite threaded portion 32.

With reference to final valve body 18, peripheral wall 28 is folded over with respect to the intermediate valve body after plug 22 and resilient means 23 have been inserted within seat 20. By folding over peripheral wall 28 a reaction portion of the resilient means is advantageously defined so as to positively press the plug against second opening 26 of valve body 18. Advantageously peripheral wall 28 is folded over by pressing.

According to a possible embodiment, first opening 24 of intermediate valve body 18a is partly closed by folded-over peripheral wall 28. Preferably folded-over peripheral wall 28 partly closes off first opening 24 and the plug partly projects from final valve body 18.

According to one possible embodiment peripheral wall 28 is folded over through a predetermined proportion of the peripheral wall to compress resilient means 23 between the plug and folded-over peripheral wall 28 to a predetermined pre-loading value and to hold plug 22 in the position in which the second opening of the valve body is closed up to a specific value of the pressure within the boiler.

Advantageously resilient means 23 are inserted around a post 36 of plug 22 which extends in the longitudinal direction 30 of seat 20. According to a possible embodiment resilient means 23 are precompressed between a flange 38 of plug 22 and the reaction portion of peripheral wall 28.

Advantageously the plug partly projects from first opening 24. The projecting end of the plug advantageously has an enlargement 40. According to one possible embodiment the plug comprises a tapering portion corresponding to post 36 located between flange 38 and the extremity projecting from first opening 24.

According to one possible embodiment plug 22 comprises a housing 42 for a sealing ring 44 designed to abut against second opening 26 of seat 20 and to keep it closed until a specific pressure is reached within the boiler.

According to one possible embodiment the plug comprises a tapering portion 46 designed to be at least partly inserted within second opening 26 of seat 20. Preferably second opening 26 is larger than tapering portion 46 of the plug and is designed to be at least partly inserted therein.

In other words the safety valve according to this invention consists of the intermediate valve body in which the peripheral wall is folded over to form the final valve body, the plug which may be provided with a sealing ring and the resilient means. Advantageously the valve body is constructed as one piece without covers or separate members to close off the seat and precompress the resilient means.

When assembling safety valve 10 on device 14 the safety valve is mounted on a wall 48 of boiler 12 in such a way that first opening 24 communicates with the exterior of the boiler and second opening 26 is in communication with the interior of the boiler.

Under normal conditions of use of the device the second opening is closed by plug 22 against which resilient means 23 act.

This invention also relates to a method for the manufacture of a safety valve for a boiler of a device for making hot beverages, in particular coffee. This method comprises the stages of:

Manufacturing an intermediate valve body 18a defining a seat 20 designed to receive a plug 22 and opening towards the exterior of the valve body itself through a first opening 24 and a second opening 26, in which the valve body comprises at least one peripheral wall 28 located in the vicinity of first opening 24, Inserting plug 22 in seat 20 of intermediate valve body 18a, Inserting resilient means 23 in seat 20 of intermediate valve body 18a, Then folding over peripheral wall 28 to define a reaction portion of resilient means 23 and to positively press plug 22 against second opening 26 of the valve body, obtaining a final valve body 18.

Advantageously, during the stage of manufacturing intermediate valve body 18a peripheral wall 28 is manufactured in such a way as to at least partly bound the first opening. In the example in FIG. 4 peripheral wall 28 is defined by a cylindrical wall which bounds first aperture 24 without discontinuity. In other embodiments, which are not illustrated, the peripheral wall may also only partly bound first opening 24 for example by comprising a series of teeth designed to be folded over. According to a further embodiment which is not illustrated, during the stage of manufacturing the intermediate valve body the peripheral wall is manufactured in such a way as to at least partly surround first opening 24.

Advantageously, during the stage of manufacturing the intermediate valve body peripheral wall 28 is manufactured in such a way as to have a cylindrical portion located along a circumference having a diameter which is smaller than the dimensions of the valve body.

Preferably peripheral wall 28 is manufactured in one piece with the valve body.

According to one possible embodiment, considering the intermediate valve body, that is prior to peripheral walls 28 being folded over, peripheral wall 28 extends along a longitudinal direction 30 of seat 20. After folding over, that is considering the final valve body, the peripheral wall is folded over transversely to the longitudinal direction 30 of seat 20, towards the interior of the seat.

FIG. 4 illustrates a cross-section of a possible embodiment of the intermediate valve body obtained by the method according to this invention.

According to one possible embodiment the stage of folding over peripheral wall 28 is performed at least partly closing first opening 24, appropriately leaving the plug to project partly from the valve body.

Figure 5:
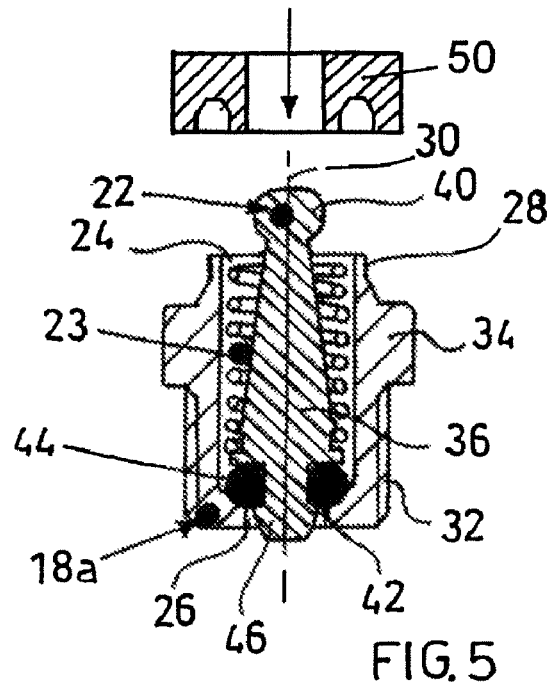
FIG. 5 illustrates a longitudinal cross-sectional view of the safety valve in FIG. 2 during one stage of the method for manufacture of the aforesaid valve.
Figure 2:
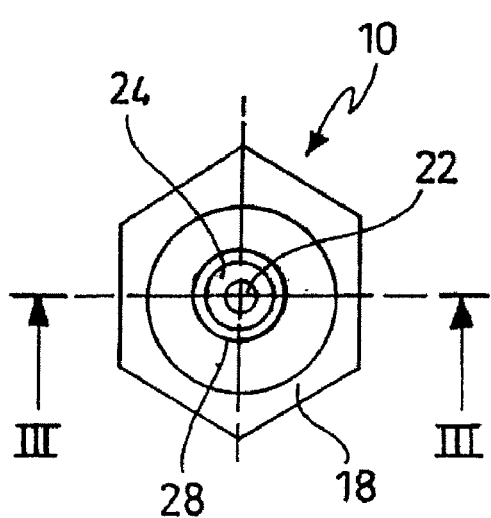
Figure 3:
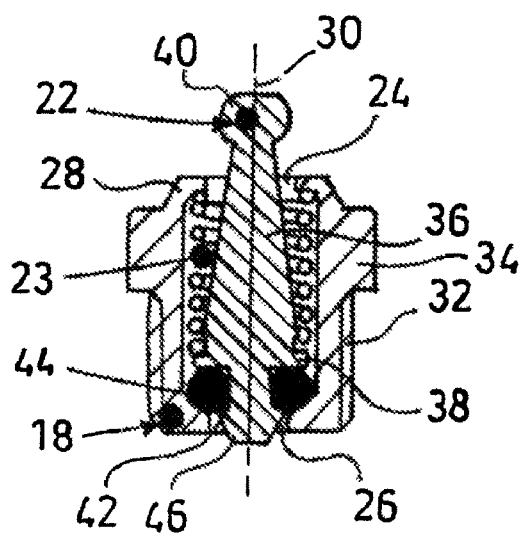

According to one advantageous embodiment, the stage of folding over peripheral wall 28 takes place through pressing (FIG. 5) through the use of a punch 50, preferably of a rim shape.

Advantageously the stage of folding over peripheral wall 28 is performed involving a predetermined proportion of the peripheral wall itself in order to compress resilient means 23 between plug 22 and the folded over peripheral wall to a predetermined preloading value and to hold plug 22 in a position closing second opening 26 of valve body 18 up to a specific value of the pressure within boiler 12.

According to one possible embodiment, both plug 22 and resilient means 23 are inserted into seat 20 through first opening 24, that is the opening designed to be placed in communication with the outside environment when the safety valve is mounted on the boiler. As a consequence the peripheral wall designed to be folded over is associated with that first opening 24.

According to a different embodiment both plug 22 and resilient means 23 may be inserted within seat 20 through the opening which is designed to be placed in communication with the interior of the boiler with reference to the condition in which the safety valve is mounted on the boiler. In this case the peripheral wall which is designed to be folded over is associated with that opening. In other words, with reference to the subsequent claims, by first opening is meant the opening with which at least one peripheral wall designed to be folded over is associated. In this case the stage of folding over the peripheral wall would define an indirect reaction portion of the resilient means, that is through a flange 38 of the plug.

Possibly both the openings of seat 20 may be associated with a corresponding peripheral wall which is designed to be folded over.

The plug and the resilient means may be inserted into the seat through different openings.

According to one possible embodiment which is for example illustrated in the figures, resilient means 23 are inserted around a post 36 of plug 22. Advantageously the resilient means are inserted around the post of the plug before the plug is inserted in the seat of the valve body.

According to one possible embodiment the method according to this invention may finally provide that the safety valve be mounted on a wall of a boiler of a device for making hot beverages, particularly coffee, in such a way that the first opening is in communication with the exterior of the boiler and the second opening is in communication with the interior of the boiler.

In other words, the method according to this invention makes it possible to manufacture a safety valve comprising the intermediate valve body comprising the folded over peripheral wall, the plug, which may be provided with a sealing ring, and the resilient means. No covers or other members which are separate from the valve body are necessary in order to immobilise the plug and the resilient means in the seat and to precompress the resilient means themselves.

The method in which the safety valve described above is used when fitted to a device for making hot beverages is described below. After the equipment has been designed for the required function, for example for making coffee, a source of heat which generally heats the lower part of the boiler is activated.

Normal operation of the device provides that when a particular pressure has been reached within the boiler the water contained therein is delivered to the upper container obtaining the beverage desired.

In the situation in which delivery does not occur the pressure within the boiler would continue to increase until it reached critical values at which the device might explode. The function of the safety valve is therefore to prevent the pressure within the boiler from exceeding a specific threshold value if the device should malfunction. When this pressure is reached the force exerted by the resilient means is overcome and the plug is moved away from opening 26, opening it and placing the interior of the boiler in communication with the outside environment.

With reference to the above, both the method according to this invention and the safety valve make it possible to reduce manufacturing costs and to reduce the components necessary, as well as some stages in assembly.

The safety valve results in being externally pleasing and achieves a high level of safety.

Also, thanks to the provision of a plug which projects from the valve body, any calcium encrustations clinging to the projecting end of the plug and displacing it with respect to the valve body can be periodically cleaned from the valve. Cleaning is made further effective by providing a plug shape in which tapering portion 46 is inserted into opening 26 in such a way that movement of the plug detaches any calcium encrustation from the edge of that opening.

It is therefore obvious that this invention makes it possible to obtain a low-cost valve which is however highly reliable and capable of being easily cleaned.

It is clear that variants and/or additions may be made to what has been described and illustrated above, as for example already previously described. Every item described as part of a possible embodiment may be provided independently of the presence of the other items described above or subsequently.

Naturally, the principle of the invention remaining the same, the forms of embodiment and details of construction may be varied widely with respect to those described and illustrated, which have been given purely by way of example, without thereby departing from the scope of the invention.

The invention claimed is:

1. Method for the manufacture of a device for making hot beverages, particularly coffee, including a safety valve mounted on a wall of a boiler comprising the stages of:
    manufacturing an intermediate valve body defining a seat configured to receive a plug and opening towards an exterior of the valve body through a first opening and a second opening, said valve body comprising at least one peripheral wall located close to said first opening, wherein said at least one peripheral wall comprises a series of teeth configured to be folded over,
    inserting the plug into the seat of the intermediate valve body, wherein the plug comprises an enlarged end that at least partly projects from the first opening; a flange; a first tapering portion creating a post extending in the longitudinal direction of the seat between the enlarged end and the flange; and a second tapering portion at least partially inserted within the second opening of the seat, wherein the second tapering portion is inserted into the second opening such that movement of the plug detaches any calcium encrustation from an edge of the second opening,
    inserting resilient means into the seat of the intermediate valve body, wherein the resilient means are inserted around the post of the plug,
    threading a threaded portion of the valve body into the wall of the boiler,
    subsequently folding over said at least one peripheral wall to define a reaction portion of the resilient means and
    positively pressing said plug against said second opening of said valve body, obtaining a final valve body.

2. Method according to claim 1, in which said stage of manufacturing said intermediate valve body comprises the stage of manufacturing said at least one peripheral wall at least partly bounding said opening.

3. Method according to claim 1, in which said stage of manufacturing said intermediate valve body comprises the stage of manufacturing said at least one peripheral wall at least partly surrounding said first opening.

4. Method according to claim 1, in which said stage of manufacturing said intermediate valve body comprises the stage of manufacturing said at least one peripheral wall having a cylindrical portion located along a circumference having a diameter less than the dimensions of the valve body.

5. Method according to claim 1, in which said stage of manufacturing said intermediate valve body comprises the stage of manufacturing said at least one peripheral wall of one piece with the valve body itself.

6. Method according to claim 1, in which the stage of manufacturing said intermediate valve body provides the stage of manufacturing said at least one peripheral wall which extends along a longitudinal direction of said seat.

7. Method according to claim 6, in which said at least one peripheral wall is folded over transversely to the longitudinal direction of said seat, towards an interior of said seat.

8. Method according to claim 1, in which said stage of folding over said at least one peripheral wall is performed through at least partly closing said first opening.

9. Method according to claim 8, in which the stage of folding over said at least one peripheral wall partly closes said first opening leaving the plug to project partly from the valve body.

10. Method according to claim 1, in which the stage of folding over said at least one peripheral wall takes place through pressing.

11. Method according to claim 1, in which the stage of folding over said at least one peripheral wall is performed involving a predetermined proportion of the peripheral wall itself to compress the resilient means between the plug and the valve body up to a predetermined pre-loading value and to hold said plug in a position closing said second opening of said valve body up to a specified value of the pressure within a boiler.

12. Method according to claim 1, in which said plug is inserted within said seat through said first opening.

13. Method according to claim 1, in which said resilient means are inserted within said seat through said first opening.

14. Method according to claim 1, in which the resilient means are inserted around the post of the plug before the plug is inserted in the seat of the valve body.

15. Method according to claim 1, in which said first opening is in communication with the exterior of the boiler and said second opening is in communication with an interior of the boiler.

16. Method according to claim 1, in which said safety valve comprises said intermediate valve body comprising said at least one folded-over peripheral wall, said plug, which may be provided with a sealing ring, and said resilient means.

17. A device for making hot beverages, in particular coffee, the device comprising:
a container portion,
a boiler portion, and
a safety valve mounted on the boiler portion, wherein the safety valve comprises a valve body and resilient means within the valve body;
said valve body comprising a seat configured to receive a plug and open towards exterior through a first opening and a second opening,
a plug and resilient means inserted in the seat of the valve body,
said valve body also comprising at least one peripheral wall located close to said first opening, wherein said at least one peripheral wall comprises a series of teeth configured to be folded over,
wherein the plug comprises an enlarged end that at least partly projects from the first opening; a flange; a first tapering portion creating a post extending in the longitudinal direction of the seat between the enlarged end and the flange; and a second tapering portion at least partially inserted within the second opening of the seat, wherein the second tapering portion is inserted into the second opening such that movement of the plug detaches any calcium encrustation from an edge of the second opening,
wherein said resilient means are inserted around the post of said plug, said peripheral wall being folded over to define a reaction portion of the resilient means and to positively press said plug against said second opening of said valve body.

18. Device according to claim 17, in which said at least one peripheral wall at least partly bounds said first opening.

19. Device according to claim 17, in which said at least one peripheral wall at least partly surrounds said first opening.

20. Device according to claim 17, in which said at least one peripheral wall has a cylindrical portion located along a circumference having a diameter which is smaller than the dimensions of the valve body.

21. Device according to claim 17, in which said at least one peripheral wall is manufactured of one piece with valve body itself.

22. Device according to claim 17, in which said at least one peripheral wall extends along a longitudinal direction of said seat and is configured to be folded over transversely to the longitudinal direction of said seat to form said valve body.

23. Device according to claim 17, in which said at least one peripheral wall is folded over transversely to the longitudinal direction of said seat, towards an interior of said seat.

24. Device according to claim 17, in which said first opening of said valve body is partly closed by said at least one folded-over peripheral wall.

25. Device according to claim 24, in which said at least one peripheral wall partly closes off said first opening of the valve body and the plug partly projects from the valve body.

26. Device according to claim 17, in which said at least one peripheral wall is folded over through pressing.

27. Device according to claim 17, in which said at least one peripheral wall is folded over through a predetermined amount of the peripheral wall itself compressing the resilient means between the plug and the valve body to a predetermined pre-loading value in order to hold said plug in a position closing said second opening of said valve body up to a specified value of the pressure within a boiler.

28. Device according to claim 17, in which the resilient means are precompressed between the flange of the plug and the reaction portion of said peripheral wall.

29. Device according to claim 17, in which said plug comprises a housing for a sealing ring configured to abut against said second opening of said seat.

30. Device according to claim 17, in which said second opening is larger than said tapering portion of the plug which is configured to be at least partly inserted therein.

31. Device according to claim 17, consisting of said valve body with said at least one folded-over peripheral wall, said plug, a sealing ring, and said resilient means.

32. Device according to claim 17, in which said valve body is manufactured as a single part.

33. Device according to claim 17, in which said first opening is in communication with an exterior of the boiler and said second opening is in communication with an interior of the boiler.

* * * * *

UNITED STATES PATENT AND TRADEMARK OFFICE
CERTIFICATE OF CORRECTION

| | | |
|---|---|---|
| PATENT NO. | : 8,381,753 B2 | Page 1 of 1 |
| APPLICATION NO. | : 11/663027 | |
| DATED | : February 26, 2013 | |
| INVENTOR(S) | : Francesco Ranzoni | |

Figure 6:
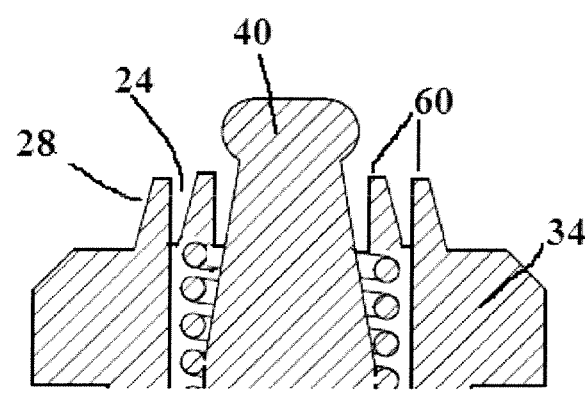
FIG. 6 illustrates an embodiment wherein the peripheral wall partly bounds the first opening by comprising a series or teeth designed to be folded over.

It is certified that error appears in the above-identified patent and that said Letters Patent is hereby corrected as shown below:

In the Specifications:

Please delete the paragraph at Column 2, Lines 59-65, and replace it with the following paragraph:

With reference to the embodiments illustrated, peripheral wall 28 bounds first opening 24. According to other embodiments, the peripheral wall may at least partly surround the first opening or only bound it partly. Two or more peripheral walls may possibly be provided, for example manufactured using teeth 60 which are designed to be folded over as illustrated in FIG. 6.

Please delete the paragraph at Column 4, Lines 26-37, and replace it with the following paragraph:

Advantageously, during the stage of manufacturing intermediate valve body 18a peripheral wall 28 is manufactured in such a way as to at least partly bound the first opening. In the example in FIG. 4 peripheral wall 28 is defined by a cylindrical wall which bounds first aperture 24 without discontinuity. In other embodiments, the peripheral wall may also only partly bound first opening 24 for example by comprising a series of teeth 60 designed to be folded over as illustrated in FIG. 6. According to a further embodiment, during the stage of manufacturing the intermediate valve body the peripheral wall is manufactured in such a way as to at least partly surround first opening 24.

Signed and Sealed this
Twenty-third Day of April, 2013

Teresa Stanek Rea
*Acting Director of the United States Patent and Trademark Office*